US008544015B2

(12) United States Patent
Attanasio et al.

(10) Patent No.: US 8,544,015 B2
(45) Date of Patent: Sep. 24, 2013

(54) DYNAMIC RESOURCE ALLOCATION USING A RESOURCE CONFIGURATION EFFORT SCORE

(75) Inventors: Luisa Attanasio, Moliterno (IT); Bruno Portaluri, Bari (IT)

(73) Assignee: International Business Machines Corporation, Armonk, NY (US)

( * ) Notice: Subject to any disclaimer, the term of this patent is extended or adjusted under 35 U.S.C. 154(b) by 1935 days.

(21) Appl. No.: 11/564,429

(22) Filed: Nov. 29, 2006

(65) Prior Publication Data

US 2007/0143767 A1 Jun. 21, 2007

(30) Foreign Application Priority Data

Dec. 21, 2005 (EP) .................................. 05112634

(51) Int. Cl.
*G06F 9/46* (2006.01)
(52) U.S. Cl.
USPC ......................................................... 718/104
(58) Field of Classification Search
USPC ......................................................... 718/104
See application file for complete search history.

(56) References Cited

U.S. PATENT DOCUMENTS

| 5,826,236 | A * | 10/1998 | Narimatsu et al. ................. 705/8 |
| 2002/0042823 | A1 * | 4/2002 | DeBettencourt et al. ..... 709/224 |
| 2003/0046298 | A1 * | 3/2003 | Weedon ......................... 707/102 |
| 2004/0230317 | A1 * | 11/2004 | Kumar et al. ....................... 700/1 |
| 2005/0147120 | A1 * | 7/2005 | Willman et al. ............... 370/466 |
| 2005/0216664 | A1 * | 9/2005 | Taninaka et al. ............... 711/114 |

FOREIGN PATENT DOCUMENTS

JP 2003-330734 11/2003

OTHER PUBLICATIONS

Hyung J. Lim, et al. "An Analysis and Evaluation of Policy-Based Network Management Approaches". The KIPS Transactions: Part C, vol. 12, No. 2, Apr. 2005 pp. 289-300.

* cited by examiner

*Primary Examiner* — Mengyao Zhe
(74) *Attorney, Agent, or Firm* — Yee & Associates, P.C.; Jeffrey S. LaBaw

(57) ABSTRACT

A provisioning method and a corresponding apparatus for managing a data processing system including a plurality of exploiter entities and a plurality of resources, the system maintaining a repository with system requirements of the plurality of exploiter entities. The provisioner monitors any possible needs for further resources of the exploiters. When such needs arise, the provisioner select an available resource within a pool of possible available resources. Such selection is done so that the effort for configuring the resource according to exploiter requirements is reduced. One feature of the method of the present invention is that two levels of requirements are defined: the "Hard Properties", i.e. those system features which cannot be easily configured; and the "Soft Properties", i.e. those features which can be easily configured. Of course the definition of Hard and Soft can be customized according to predetermined conditions. According to a preferred embodiment of the present invention, Hard Properties are those features which cannot be automatically configured and which may require an operator intervention or long awaiting times, while Soft Properties are those which can be automatically modified.

2 Claims, 4 Drawing Sheets

DYNAMIC RESOURCE ALLOCATION USING A RESOURCE CONFIGURATION EFFORT SCORE

TECHNICAL FIELD

The present invention relates to the data processing field. More specifically, the present invention relates to a method for dynamic resources allocation in a provisioning system. In particular the problem of selecting a new resource to be configured according to predetermined requirements is addressed by the present invention. The invention further relates to a computer program for performing the method, and to a product embodying the program. Moreover, the invention also relates to a corresponding apparatus.

BACKGROUND ART

In a complex industrial organisation with an Information Technology (IT) infrastructure, the management of resources (both Hardware and Software) is a key factor which can affect profitability of the overall company. A system for automating the management of the infrastructure is needed to minimise IT related costs. It is known to use a Provisioning Manager to automate provisioning and deployment processes. A Provisioning Manager has the task of managing data centre processes, including installing, configuring and deploying servers, operating systems, middleware, applications, storage and network devices. An example of state of the art Provisioning Manager is the ITPM (IBM Tivoli Provisioning Manager) product of International Business Machines Corp. A problem which a Provisioning Manager could face is the choice of a new server to be assigned to e.g. an application which needs a new resource, e.g. an additional server. When such a need arises, the Provisioning Manager selects a server among a pool of available servers and assigns it to the requester. Before the assignment can take place, however the server must be "rebuilt", i.e. it must be reconfigured according to the requirements set by the new destinations. Rebuilding activities include several kinds and different levels of configuration which generally involve hardware, operating system, network, middleware and applications installation and/or customisation. According to state of the art systems, the selection of the server to be rebuilt and assigned is performed without taking into account the logical "distance" between the initial status and the desired final configuration settings.

An improved method which could optimise the choice limiting the configurations activities would be therefore highly desirable.

It is an object of the present invention to provide a method and a system which alleviates the above drawbacks.

SUMMARY OF THE INVENTION

According to the present invention we provide a provisioning method for managing a data processing system including a plurality of exploiter entities and a plurality of resources, the system maintaining a repository with system requirements of the plurality of exploiter entities, a set of the plurality of resources being available for assignment to the plurality of exploiter entities, the method including the steps of: detecting the need for at least one of the plurality of exploiter entities of at least one resource; assigning a score to each of the available resources, the score being indicative of the effort required to configure the resource to the requirements of the at least one exploiter entity; selecting at least one available resource according to the assigned score, so that the configuring effort is minimized.

A further aspect of the present invention provides a computer program for performing the above-described method.

A still further aspect of the invention provides a program product embodying this program.

Moreover, another aspect of the invention provides a corresponding apparatus for implementing the above method.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
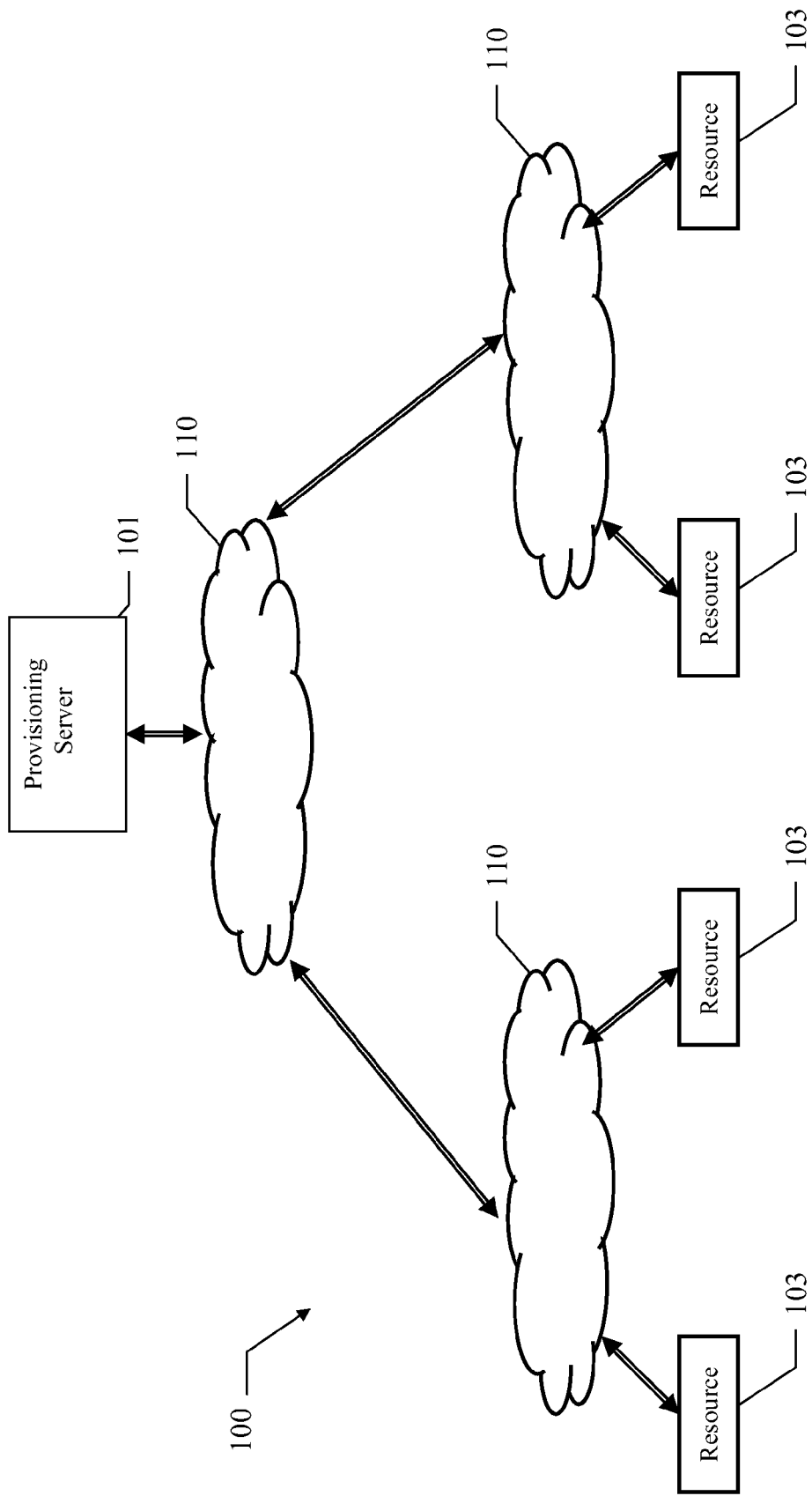
FIG. 1 is a schematic block diagram of a computer network in which the method of the invention is applicable.

FIG. 1 represents a typical network of computers (100) using a provisioning manager system which could implement the present invention. A provisioning server 101 is connected to the network 110. The provisioning server 101 automatically adds or removes resources 103 to/from the system 100 according to the corresponding real-time needs. Server 101 may be, for example a RISC server like IBM 7029-6E3 produced by International Business Machines Corp. running AIX 5.3 as operating system. resource nodes 103 could be Think Centre 8142-37G produced by International Business Machines Corp running e.g. Windows or Linux operating system. Provisioning server and resources nodes 103 are connected through networks 110 (e.g. Local Area Network).

Figure 2:
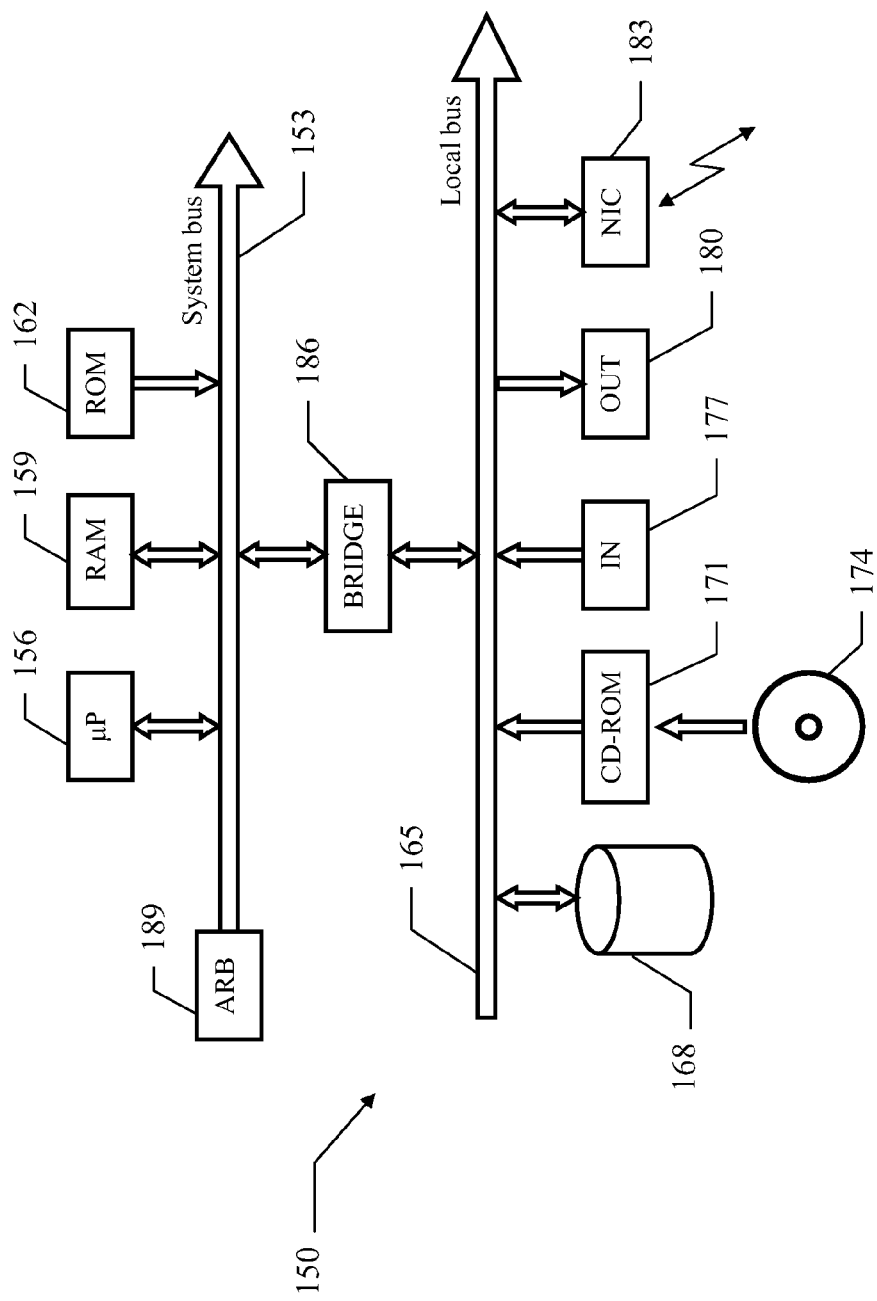
FIG. 2 shows the functional blocks of a generic computer of the system.

As shown in FIG. 2, a generic computer of the system (provisioning server or resource node) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on other networks. Alternatively, the computers have a different structure, include equivalent units, or consist of other data processing entities (such as PDAs, mobile phones, and the like). In any case, the solution of the invention is also suitable to be used in a system wherein the control of the workstations is decentralized.

Figure 3:
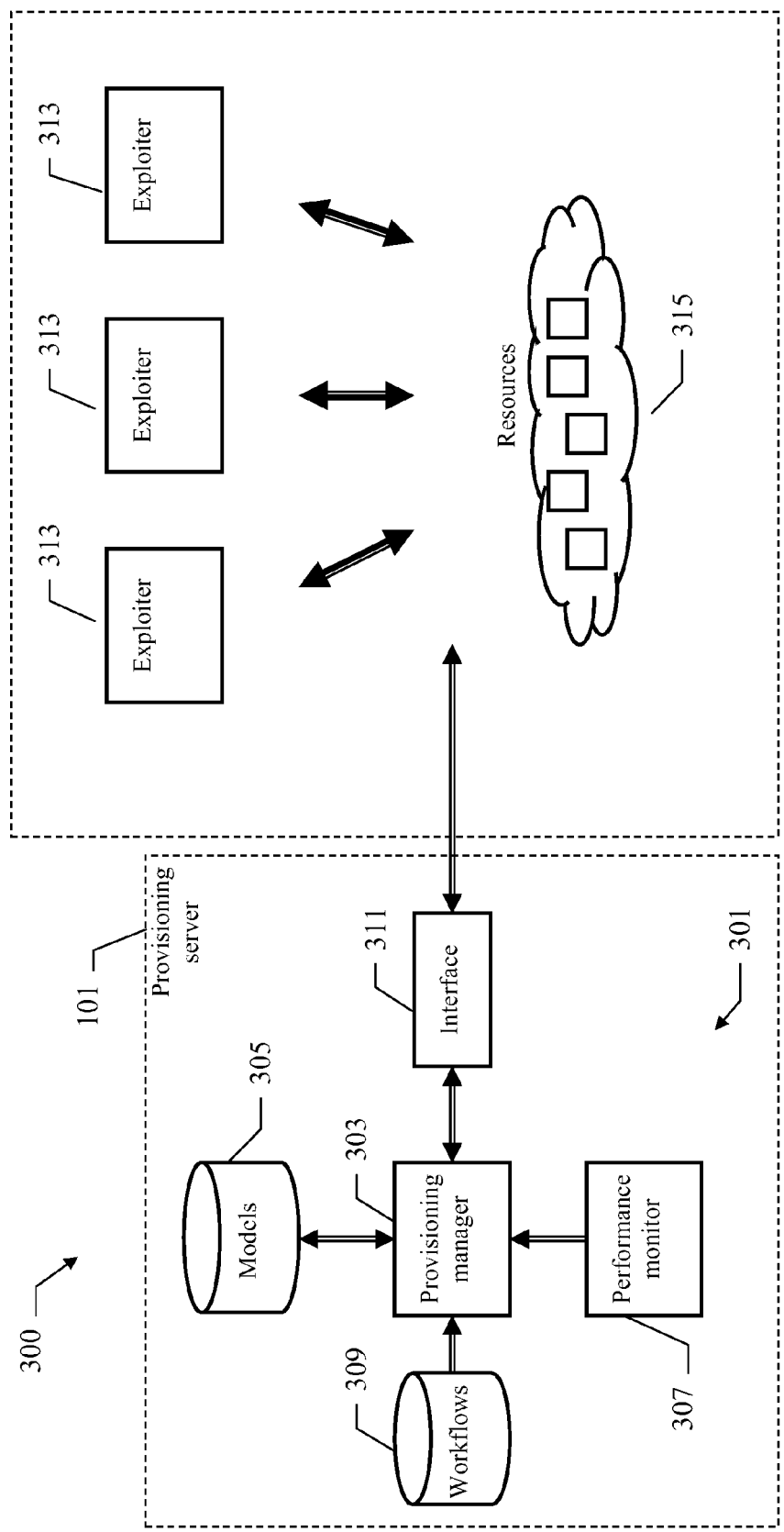
FIG. 3 depicts the main components that can be used for practicing the method.

Considering now FIG. 3, the main components that can be used to practice the method of a preferred embodiment of the invention are illustrated. The information (programs and data) is typically stored on the hard-disks of the different computers and loaded (at least partially) into the corresponding working memories when the programs are running.

According to a preferred embodiment of the present invention provisioning server 101 runs a provisioner 301 (for example, the "IBM Tivoli Provisioning Manager or ITPM" by International Business Machines Corporation). The core of the provisioner 301 consists of a manager 303, which controls the allocation of the resources in the system. For this purpose, the provisioning manager 303 stores a virtual representation of the system into a model repository 305. The model repository 305 defines multiple types of applications (such as web services, database facilities, batch jobs, and the like); each application type shares a corresponding pool of resources. Provisioning Manager 303 controls though an interface 311 the operations of applications 313 (Exploiters) and assigns the resources 315 when the needs arise. Particularly, each application 313 is associated with a corresponding application type in the model repository 305 (with the same pool resources). Moreover, for each exploiter the model repository 305 also specifies an allocation policy; the allocation policy defines the conditions that control the allocation of the resources to the corresponding pool (for example, so as to ensure a desired service level).

The provisioning manager 303 interfaces with a performance monitor 307; the performance monitor 307 continually measures state parameters (or metrics) of the managed exploiters (such as their processing power usage, hard-disk occupation, working memory consumption, and the like). Whenever the measured state parameters indicate a critical condition that should impair the desired service level of a generic application type, the provisioning manager 303 will take appropriate actions in an attempt to prevent the problem (as defined by the corresponding allocation policy in the model repository 305). For example, the provisioning manager 303 may add further resources (e.g. Additional servers) to the pool or move some resources from another (under-exploited) pool. At the same time, the provisioning manager 303 automatically configures the (added or moved) servers for the required tasks; the operations to be executed for this purpose (such as install software applications, configure system parameters, set up hardware devices, and the like) are defined by corresponding workflows, which are stored into a database 309. This automatically configuration task can be very demanding if the server is not carefully chosen. According to a preferred embodiment of the present invention the server to be assigned to the exploiter is selected among the available resources so that the time and effort necessary to re-configure (or "rebuild") is minimized.

According to a preferred embodiment of the present invention two levels of requirements are defined: the "Hard Properties", i.e. those system features which cannot be easily configured; and the "Soft Properties", i.e. those features which can be easily configured. Of course the definition of Hard and Soft can be customized according to predetermined conditions. According to a preferred embodiment of the present invention, Hard Properties are those features which cannot be automatically configured and which may require an operator intervention or long awaiting times, while Soft Properties are those which can be automatically modified. E.g. hardware features usually are more difficult to be modified. Another example is the Operating System which may require the physical availability of installation supports (e.g. installation CD-ROM) and possibly the intervention of an operator.

Examples of Hard Properties are:
Hardware Type;
RAM size;
Disk space;
CPU.
More easily configurable features are e.g.:
Operating System (but this can be made difficult under certain conditions);
O.S. Version;
Installed applications;
Network configurations.

We call these feature: "Soft Properties". It is implicit that the "classification" of Hard and Soft can be flexible and can change according to predetermined conditions or user preferences.

According to a preferred embodiment of the present invention, for each Soft Property a Preparation Time is assigned; The Preparation Time (PT) is the expected time needed to update or reconfigure the system and can be predefined by the user or computed with statistical method or acquired with any other means.

For each available resource a Resource Value (RV) can be defined which is an estimation of the business value of the resource. For example a multiprocessor system with 2 Gb of RAM will have a greater Resource Value then a single-processor system with 500 Mb of RAM. A good Resource Value estimation can be the actualized cost of the resource hardware.

In the pool of available servers, a set of candidates servers which satisfy the Hard Properties is identified. For each one of the eligible machines chosen in the first step, a Total Preparation Time can be calculated. This time is the sum of Preparation Times needed to configure each one of the Soft Properties as required. According to a preferred embodiment of the present invention, a score is then assigned to the candidate servers according to the following formula:

$$F(V,T)=KV^*(\text{Resource Value})+KT(\text{Total Preparation Time})$$

Where KV and KT are predetermined weights based on the priority of the Resource Value versus Total Preparation Time. For example, if the only priority is the get the desired resource as quick as possible KV can be set to 0; in this case hardware resources will be wasted. Otherwise, to minimize the usage of resources with high Resource Value KT should be set to 0. The right tradeoff between the two coefficients can be determined based on customer needs.

Figure 4:
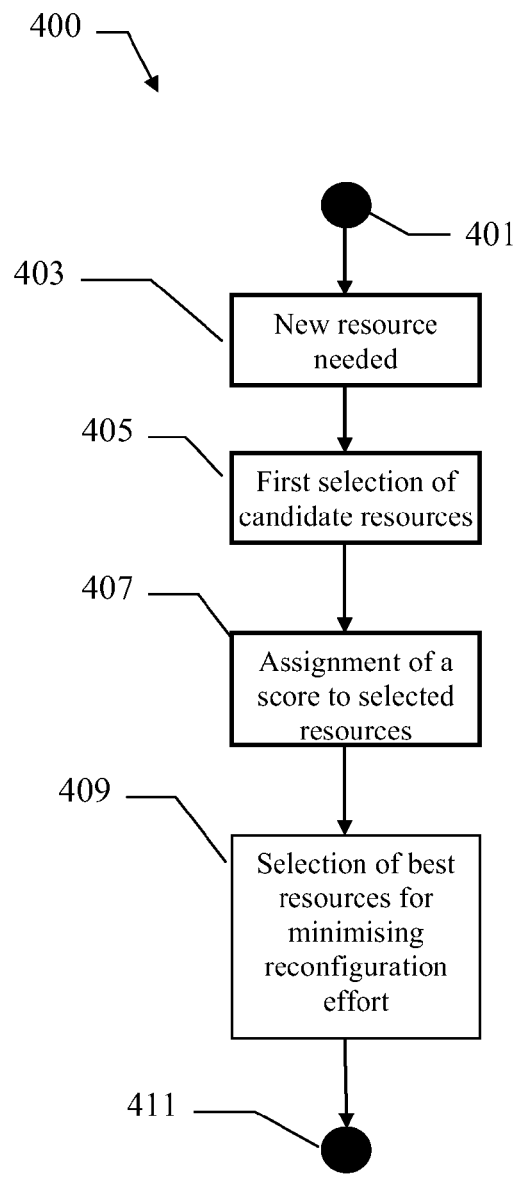
FIG. 4 show a diagram describing the flow of activities relating to an illustrative implementation of the method.

Considering now FIG. 4, the logic flow of a license manager process with a secure backup according to an embodiment of the invention is represented with a method 400. The method begins at the black start circle 401 and goes to step 403 where the need for the assignment to an exploiter (e.g. an application) of a new resource is detected by the Provisioning Manager 303. Such detection can be made by the provisioner itself according to the Performance Monitor 307 and the Models repository 305 and the Workflow database 309. Alternative an Orchestrator tool might be associated to the provisioner. Furthermore it could be that an explicit request (e.g. from a system administrator) is received. In any case the control goes to step 405 where the first selection of all available resources is made according to predefined Hard Properties. At step 407 a total score to each selected resources is assigned according to the above described formula and the weighted resources are listed according to the total score and the resource believed to be the best resource is then selected to be assigned to the exploiter (step 409). The process then ends with step 411.

The method described above in term of sequence of steps it's just one of the possible implementations. Those skilled in the art will easily understand that different implementations can be used instead. E.g. it is possible that both Hard and Soft Properties are considered together to assign a total score before a selection is made. Also the thresholds which differentiate the Hard Properties and the Soft Properties can be made dynamically configurable and it is even possible that more than two categories of Properties are used.

Similar considerations apply if the programs and data are structured in a different manner, if other modules or functions are provided, or if the information is stored in equivalent memory structures.

Similar considerations apply if the method includes equivalent or additional steps.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention. E.g. as mentioned above the assignment of a total score to the candidate resources can be made in different ways and using different formulas.

In addition, the programs can be distributed on any other computer readable medium (such as one or more DVDs); alternatively, the programs are pre-loaded onto the harddisks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A provisioning method for managing a data processing system including a plurality of exploiter entities and a plurality of resources, the data processing system maintaining a repository with system requirements of the plurality of exploiter entities, a set of the plurality of resources being available for assignment to the plurality of exploiter entities, the method including the steps of:
   detecting a need for at least one of the plurality of exploiter entities of at least one resource;
   assigning a score to each of the available resources, the score being indicative of an effort required to configure the at least one resource to the system requirements maintained in the repository of the at least one exploiter entity; and
   selecting at least one available resource according to the assigned score, so that the configuring effort is minimized, wherein each resource has a plurality of properties, each property being assigned a value indicative of the effort required to modify the property according to the requirements of the at least one exploiter entity, wherein the assigned value includes a Resource Value indicative of the business value of the property, and wherein the score includes a value calculated with the following formula $$F(V,T)=KV*V+KT*T$$

where V is the Total Resource Value, indicative of the Resource Value of all resource properties, T is the Total Preparation Time, indicative of Preparation Time of all resource properties, KV and KT are respectively predetermined weights of V and T.

2. A system for managing a data processing system including a plurality of exploiter entities and a plurality of resources, the system comprising a processor coupled to a memory comprising program instructions that are operable, when executed by the processor, to perform steps of:
   detecting a need for at least one of the plurality of exploiter entities of at least one resource;
   assigning a score to each of the available resources, the score being indicative of an effort required to configure the resource to the system requirements maintained in the repository of the at least one exploiter entity; and
   selecting at least one available resource according to the assigned score, so that the configuring effort is minimized, wherein each resource has a plurality of properties, each property being assigned a value indicative of the effort required to modify the property according to the requirements of the at least one exploiter entity, wherein the assigned value includes a Resource Value indicative of the business value of the property, and wherein the score includes a value calculated with the following formula $$F(V,T)=KV*V+KT*T$$

where V is the Total Resource Value, indicative of the Resource Value of all resource properties, T is the Total Preparation Time, indicative of Preparation Time of all resource properties, KV and KT are respectively predetermined weights of V and T.

* * * * *